UNITED STATES PATENT OFFICE.

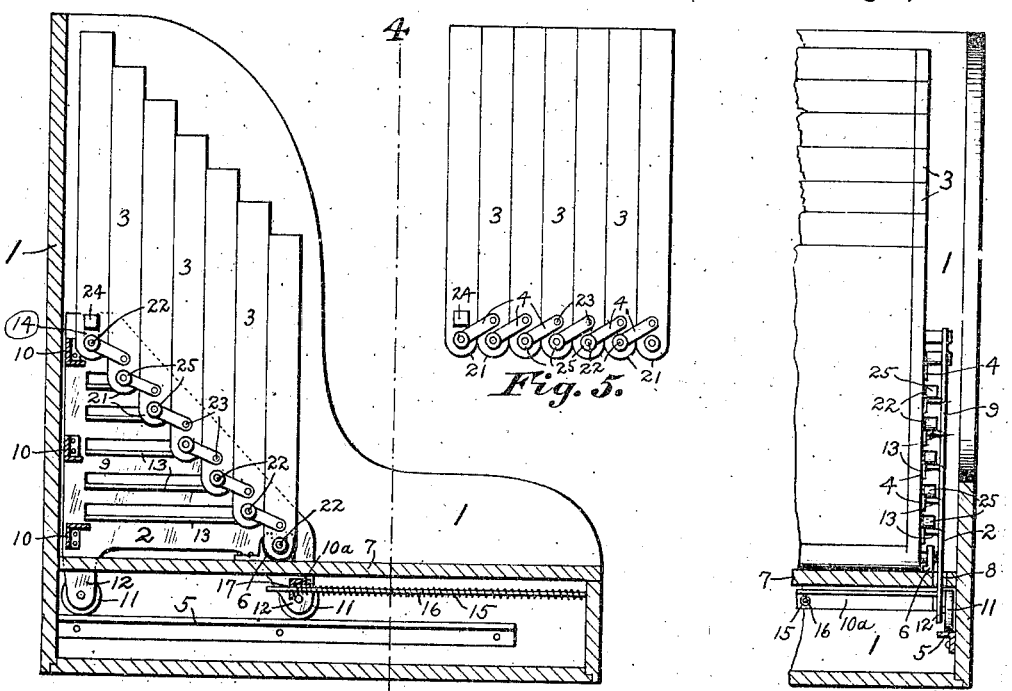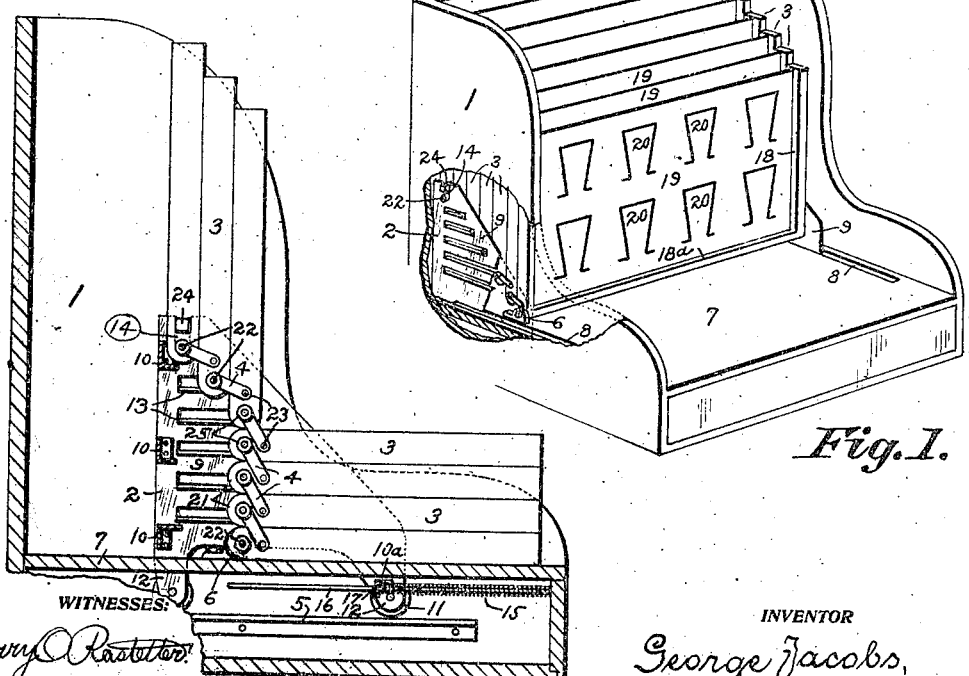

GEORGE JACOBS, OF ALLIANCE, OHIO, ASSIGNOR, BY DIRECT AND MESNE ASSIGNMENTS, TO THE McCASKEY REGISTER COMPANY, OF ALLIANCE, OHIO, A CORPORATION OF OHIO.

BILL-FILING CABINET.

966,448.  Specification of Letters Patent.  Patented Aug. 9, 1910.

Application filed May 25, 1908. Serial No. 434,866.

*To all whom it may concern:*

Be it known that I, GEORGE JACOBS, a subject of the Emperor of Germany, residing at Alliance, in the county of Stark and State of Ohio, have invented a new and useful Bill-Filing Cabinet, of which the following is a specification.

The invention relates to a filing cabinet for bills of sales or accounts, as of a retail merchant, and more particularly to that class of cabinets containing a series of leaves located uprightly in echelon, so that the upper edge of each leaf is exposed above the edge of the leaf in front of it, the leaves being hinged or pivoted and adapted to be folded forward for the purpose of exposing and giving access to the sides of the several leaves.

One object of the invention is to provide means for individually and collectively connecting and gearing the leaves so that, when folded forward to a prone position, or when removed from the case, they are adapted to be collocated or assembled face to face in a rectangular pack, within a space substantially equal to the area of one leaf and the combined depth of all the leaves, so that in this relation the entire series of leaves can be readily inserted in a safe or vault for security without consuming undue space therein.

A further object of the invention is to provide means for automatically moving the uprightly disposed leaves forward or backward at the same time the leaves in front of them are lowered or raised, so that the foremost one of the uprightly disposed leaves always occupies the same vertical plane and is, therefore, conveniently accessible for inserting and removing bills at the same distance from the forward side of the cabinet.

These general objects, and other subsidiary purposes, are attained by the construction, mechanism and arrangement illlustrated in the accompanying drawing, in which—

Figure 1 is a perspective view of the cabinet, showing the leaves in their normal upright position with some parts broken away to show minor details; Fig. 2, a vertical-longitudinal section of the case and carriage, showing the ends of the leaves in their normal vertical position; Fig. 3, a similar section, showing some of the leaves rotated forward to their prone position; Fig. 4, a transverse-vertical section of one side of the cabinet, on line 4—4, Fig. 2; and Fig. 5, an end elevation of the leaves removed from the cabinet and collocated in a rectangular pack.

Similar numerals refer to similar parts throughout the drawing.

The cabinet is composed of the case 1, the carriage 2 and the series of leaves 3, with the connecting links 4. The case 1 is preferably made open in front and on top to give free access to the leaves. The horizontal track 5 is formed or attached on each side wall of the case near the bottom thereof, and immediately inside of these tracks are located the U-shaped bearings 6 which are preferably secured on the shelf 7 in the case, which shelf is provided with the longitudinal slots 8 for receiving the side-plates of the carriage.

The carriage 2 is composed of the side-plates 9, the transverse bars 10 and 10$^a$ and the wheels 11, which wheels are journaled in the legs 12 of the side-plates and are adapted to rest and travel on the case tracks. The horizontal flanges forming the ways 13 are cut and pressed inward from the side-plates of the carriage, each way extending forward beyond the one above it; and the U-shaped sockets 14 are formed in the rear-upper edge of the side-plates. The spiral compression spring 15 is preferably provided between the transverse bar 10$^a$ of the carriage and the front wall of the case, and, as shown, this spring is held in proper position by the rod 16, which extends inside the spring from the front wall of the case backward through the aperture 17 in the transverse bar. The action of this spring tends to force the carriage backward in the case.

The leaves 3 are preferably formed with end and side rims 18 and 18$^a$ and relatively thin middle plates 19, thus forming recesses in each side of the leaves for the filing of bills which are held by the clips 20 in the usual manner. The normal lower edge 21 of each leaf is rounded, and the pivot pins or trunnions 22 are provided on each end substantially in the axis of the rounded edge. The leaves are hinged or connected together by means of the links 4, the rear end of each link being pivoted on the trunnion of one leaf and the forward end being pivoted at 23 to the end of the adjoining leaf at a point on the inner side of the trunnion with reference to the rounded edge of the leaf. This manner of hinging and connecting the leaves of the series, permits them to be assembled side by side, in echelon, as shown in Figs. 1 and 2, and also to be collocated in a rectangular pack, as shown in Fig. 5.

The leaves are placed in the case in their upright position by inserting the trunnions of the front-lower leaf in the U-shaped bearings of the case, by resting the trunnions of the intermediate leaves on the respective ways of the carriage, and by inserting the trunnions of the rear-upper leaf in the U-shaped sockets of the carriage. The lugs 24 are provided on the side edges of the upper-rear plate adjacent to the trunnions, which lugs are adapted to enter the U-shaped sockets and hold this leaf in upright position; and the antifriction rollers 25 are preferably provided on the trunnions of the intermediate leaves to travel and rotate on the carriage ways.

The parts are so proportioned and arranged that when the leaves are thus placed in the case and on the carriage, they will be positively supported and held in upright position, face to face, in echelon, as shown in Figs. 1 and 2. Any tendency of the leaves to rotate or move forward, is resisted by the action of the spring which holds the carriage back in the case, the pull of the links which connect the trunnion pivots of one leaf to a point in the next forward leaf above its trunnion pivot, and by the fixed case bearings which hold the trunnions of the front-lower leaf against rearward movement. When, however, it is desired to rotate one or more of the leaves forward to a prone position, the same is done by the hand of the operator against the resistance of the spring; and, in so doing, all the remaining upright leaves are drawn forward a distance equal to the interval occupied by each of the leaves which are so rotated, and the carriage is likewise drawn forward an equal distance by its connection with the rear-upper leaf. When it is desired to return one or more of the leaves to the upright position, the same are started by the hand of the operator, and after being raised a short distance the energy of the spring is such that the leaves are automatically carried the remainder of the way to the upright position.

The rear-upper leaf is always held in upright position when in the case by the engagement of its trunnions and lugs in the U-shaped sockets of the carriage side-plates, but it is evident that by removing the leaves from the case, which is accomplished by bringing them all to an upright position and by merely lifting the trunnions of the front-lower leaf out of the U-shaped bearings, and the trunnions and lugs of the rear-upper leaf out of the U-shaped sockets, the leaves are adapted to be assembled together, side by side, in a rectangular pack, as shown in Fig. 5, in which relation they are adapted to be stored in a comparatively small receptacle.

It is evident that the rounding of the lower edges of the leaves is not essential for the reason that the links are slightly longer than the distance between the centers of the leaves when the same are collocated, and there is thus considerable freedom in the rotation of the leaves on their pivots; but it is preferred to round the lower edges, at least in their forward quadrants, for the purpose of reducing the frictional resistance during the rotation of the leaves.

What I claim as my invention, and desire to secure by Letters Patent, is—

1. A cabinet including a case with fixed bearings on opposite sides therein, a movable carriage in the case having a tier of ways and a socket on each side, a series of collocated leaves having trunnions near their normal lower ends, and links connecting the ends of the leaves, one end of each link being pivoted on the trunnion of one leaf and the other end to the adjoining leaf inside the trunnion thereof; the trunnions of the front-lower leaf being rotatably supported in the case bearings, the trunnions of the intermediate leaves being rotatably and movably supported on the carriage ways, and the trunnions of the rear-upper leaf being non-rotatably supported in the carriage sockets; with means acting to force the carriage backward in the case.

2. A cabinet including a case with fixed bearings on opposite sides therein, a movable carriage in the case having a tier of ways and a socket on each side, a series of collocated leaves having trunnions near their normal lower ends, and links connecting the ends of the leaves, one end of each link being pivoted on the trunnion of one leaf and the other to the adjoining leaf inside the trunnion thereof; the trunnions of the front-lower leaf being rotatably supported in the case bearings, the trunnions of the intermediate leaves being rotatably and movably supported on the carriage ways, and the trunnions of the rear-upper leaf being non-rotatably supported in the carriage sockets.

3. A cabinet including a case, a movable carriage in the case having a tier of ways on each side, a series of normally upright leaves having trunnions near their normal lower ends, and links connecting the ends of the leaves, one end of each link being pivoted on the trunnion of one leaf and the other end to the adjoining leaf inside the trunnion thereof; the foremost and rearmost leaf trunnions being supported respectively on the case and the carriage and the intermediate leaf trunnions being adapted to travel on the carriage ways; with means acting to force the carriage backward in the case.

4. A cabinet including a case, a movable carriage in the case having a tier of ways on each side, a series of normally upright leaves having trunnions near their normal lower ends, and links connecting the ends of the leaves, one end of each link being pivoted on the trunnion of one leaf and the other end to the adjoining leaf inside the trunnion thereof; the foremost and rearmost leaf trunnions being supported respectively on the case and the carriage and the intermediate leaf trunnions being adapted to travel on the carriage ways.

5. A cabinet including a case, a movable carriage in the case having a tier of ways therein, and a series of normally upright rotatable leaves geared together at one end; the axes of the foremost and rearmost leaves being supported respectively on the case and the carriage, and the axes of the intermediate leaves being adapted to travel on the carriage ways; with means acting to force the carriage backward in the case.

6. A cabinet including a case, a movable carriage in the case having a tier of ways therein, and a series of normally upright rotatable leaves geared together at one end; the axes of the foremost and rearmost leaves being supported respectively on the case and the carriage, and the axes of the intermediate leaves being adapted to travel on the carriage ways.

7. A series of filing leaves located face to face, and a series of links connecting the normal lower ends of the leaves, one end of each link being pivoted to one leaf adjacent to its lower end, and the other end being pivoted to the adjoining leaf above the pivot-point of another link, whereby the leaves are adapted to be collocated either in echelon or in a rectangular pack and to have their free ends opened apart.

GEORGE JACOBS.

Witnesses:
 HARRY FREASE,
 RUTH A. MILLER.